Sept. 4, 1934.   A. LINKER   1,972,306
CONNECTER FOR ELECTRIC CIRCUITS
Filed Nov. 20, 1930
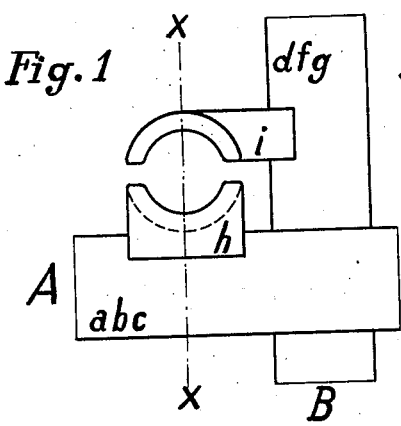
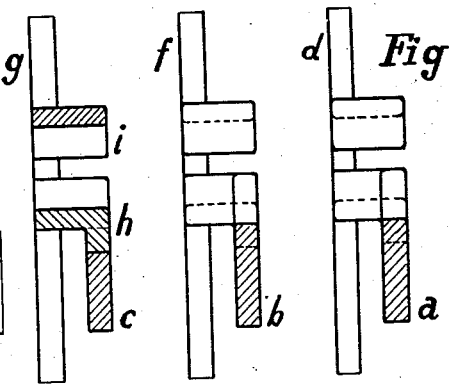
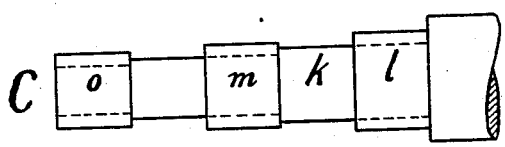
Fig. 1
Fig. 2
Fig. 4
Fig. 3
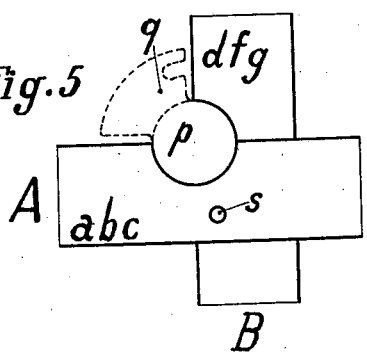
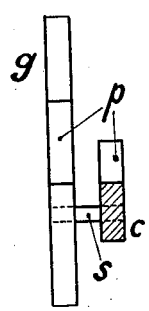
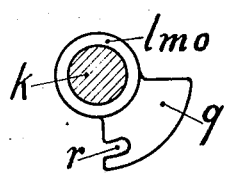
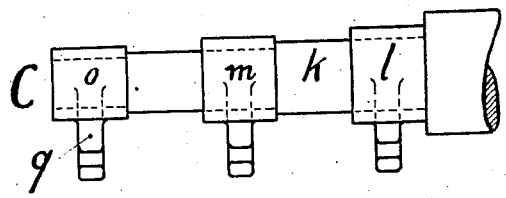
Fig. 5
Fig. 6
Fig. 8
Fig. 7
Inventor:
Arthur Linker.

Patented Sept. 4, 1934

1,972,306

UNITED STATES PATENT OFFICE 1,972,306

CONNECTER FOR ELECTRIC CIRCUITS

Arthur Linker, Hanover, Germany

Application November 20, 1930, Serial No. 496,997
In Germany December 16, 1929

3 Claims. (Cl. 173—328)

Connecters for electric circuits with crossed bars and connecting plugs serve for connecting electric wiring systems, which as a rule are connected to a source of current, with other wiring systems, which mostly lead to the current consumers. Under certain circumstances a plurality of wiring systems connected to sources of current can be connected together or to a common consuming circuit.

In the connecters hitherto known, the poles belonging to a wiring system, mostly in the shape of rectangular bars, are each arranged in a vertical plane, so that the bars of the current supply systems, mostly extending horizontally, and arranged one above the other perpendicularly intersect the bars of the consumer wiring systems situated in a plane behind same and arranged side by side. For connecting two connecting bars situated one behind the other, metal plugs are used, which are inserted or screwed into holes at the points of intersection of the conducting bars.

This arrangement is open to the objection, that the surface dimensions of the connecter in numerous systems is comparatively large, so that its production is expensive and its operation inconvenient. Moreover, for connecting two systems, as many plugs are necessary as there are poles. Further, the great length of the bars and their weakening owing to the plug holes increase the electrical resistance and consequently also the loss of voltage, apart from the great amount of time required for inserting and removing the screw plugs.

All these disadvantages are overcome according to the invention in that the pole bars of one system A or B consisting each of two or more lines or lead bars perpendicularly inserted to those of the other system are arranged, according to the number of poles, each in two or more vertical planes the one behind the other, and that in each case all poles belonging together of the two systems A and B are suitably connected together by one single plug-like, rigid connecting element, containing circuit closing elements, sometimes for currents of high strength, fitting in separate metal contacts (Figs. 1 and 2), arranged one behind the other and fastened on each bar.

Two embodiments of the main elements of a connecter in the shape of two three-pole systems A and B to be connected together are illustrated by way of example in the accompanying drawing in which:

Fig. 1 shows a form of construction of both systems A and B in front elevation.

Fig. 2 is a vertical cross section of Fig. 1.

Fig. 3 shows in side view the connecting plug C.

Fig. 4 is a cross section of Fig. 3 through the end of the circuit closing element $m$.

Figs. 5 to 8 show in similar views as Figures 1 to 4 a modified form of construction.

The system A, in the examples assumed to be three-polar and arranged one above the other, consist each of horizontal bars $a$, $b$, $c$, (Fig. 1, 2, 5 and 6), if necessary to be connected to the current producer, which bars are held in known manner insulated in a holder of suitable construction. Contrary to the known constructions with horizontal bars arranged one above the other, the bars $a$, $b$, $c$ of the horizontal systems according to the invention are arranged one behind the other in three vertical planes.

Bars $d$, $f$, $g$ of the vertical system B are arranged in three vertical planes one behind each of the bars $a$, $b$, $c$ of the horizontal system and cross same at right angles. The bars $d$, $f$ and $g$ are generally connected to the current consumers. The bars may have cylindrical bores arranged one behind the other in which plugs with cylindrical circuit closing elements $l$, $m$ and $o$ (Figs. 3 and 4) can be inserted.

In order to obtain a better conducting connection, especially with high current strengths, it is advisable, to use the following arrangement according to Figs. 1 and 2. In this instance hollow semi-cylindrical metal contacts $h$, $i$ are connected to the bars, by soldering, welding, bolting or the like, and shown in front elevation in Fig. 1 on the bars $a$, $d$ and $b$, $f$, however connected to $c$, $g$ as shown in section in Fig. 2 on line $x$—$x$ of Fig. 1.

If it is desired to electrically connect polewise one of the horizontal supply systems A with any one of the consumer systems B, a single connecting plug C (Figs. 3 and 4) is inserted into the metal contact pieces $h$ and $i$ situated at their point of intersection. According to Fig. 3 this plug consists of an insulating shank $k$ and of cylindrical circuit closing elements $l$, $m$ and $o$, arranged thereon at suitable distances apart. In order that these contact closing elements when being inserted may pass easily through the contact pieces not belonging thereto, their diameter is preferably slightly reduced towards the end in steps.

As a rule the plug contacts and the circuit closing elements are preferably made of cylindrical shape for facilitating manufacture.

Figs. 5 to 8 show a modified form of construction, which is preferable for simpler connecters and less high current strength. In this instance the separate metal contacts $h$, $i$ fixed to the bars are omitted. In order nevertheless to effect a good connection between the corresponding bars of the individual poles, the bars arranged one behind the other in Figs. 5 and 6 have each a cylindrical milled out portion $p$, which has as centre the point of intersection of the inner edges of each pair of companion-horizontal and vertical bars and, in this instance, comprises three quarters of a circle. These milled out portions serve on the one hand as guide for the plug C to be inserted (Figs. 7 and 8), and on the other hand they form a good conducting bar connection with the circuit closing elements $l$, $m$ and $o$, fixed on the insulating shank $k$. In order, however, to further reduce the contact resistance of the connecting points, the circuit closing elements $l$, $m$ and $o$ are preferably provided with sector-shaped metal projections $q$ which, after the insertion of the plug C into the milled out portions $p$, can be pushed as a further circuit closing connection by turning the plug 180° from the position shown in dotted lines in Fig. 4 between the bars $a$, $d$ or $b$, $f$ or $c$, $g$, which are to be connected. In the extreme position the metal projections $q$ further engage by means of a slot-like cavity $r$, around an insulating pin $s$ arranged between the bars, serving as stop, and thus effect at the same time a strong pressing of the circuit closing elements $l$, $m$ and $o$ against the bearing faces in the milled out portions $p$ of the bar, when the slot $r$ is made of suitable shape.

The entire connecter in this shape does not require a heavy marble plate as cover plate, but a thin insulating plate of pertinax, stabilite or the like with the insertion apertures for the connecting plugs is sufficient as cover.

The special advantages of the application as compared with the known forms of construction is most easily explained by the fact, that for one of the most usual arrangements with two and three pole systems, which in the constructions hitherto general required a thick large marble plate and a corresponding wall surface of, for example 4 square meters, only about 1 square meter and consequently only about one half of the conducting bar weight is necessary in the new construction according to the invention. Besides which the lesser number of plugs, smaller losses of voltage and more simple switching and operation, besides lower transport and erection expenses, constitute further advantages.

I claim:—

1. A connecter for electric circuits, comprising in combination a horizontal and a vertical system said horizontal system and said vertical system including a number of pole bars arranged one behind the other in different planes the pole bars of said horizontal system alternating with the pole bars of the coordinate vertical system, metal contacts on each bar, the contacts on the vertical bars forming pairs with those on the respective horizontal bars, a plug element adapted to be inserted in said metal contacts, and circuit closing elements on said plug element bridging said pairs of said metal contacts to connect the pole bars of the horizontal and vertical systems.

2. A connecter for electric circuits, comprising in combination a horizontal and a vertical system said horizontal and said vertical system including a number of pole bars one behind the other in different planes, the pole bars of said horizontal system alternating with the pole bars of the coordinate vertical system, curved milled out portions in each bar, the milled out portions on the vertical bars forming pairs with those in the respective horizontal bars, a plug element adapted to be inserted in said milled out portions, circuit closing elements on said plug element bridging said pairs of said milled out portions to connect the pole bars of the horizontal and vertical systems, and segment shaped metal projections one on each of said circuit closing elements of a width corresponding to the gap between two adjacent bars adapted on the rotation of said plug element to bear against the adjacent faces of two of said bars to establish electric connection between said horizontal and said vertical systems.

3. A connecter for electric circuits, comprising in combination a horizontal and a vertical system said horizontal system and said vertical system including a number of pole bars arranged one behind the other in different planes, the pole bars of the horizontal system alternating with the pole bars of the coordinate vertical system, curved milled out portions in each bar, said milled out portions on the vertical bars forming pairs with those on the respective horizontal bars, a plug element adapted to be inserted in said milled out portions, circuit closing elements on said plug element bridging said pairs of said milled out portions to connect the pole bars of the horizontal and vertical systems, segment shaped metal projections one on each of said circuit closing elements of a width corresponding to the gap between two adjacent bars, and each having an arcuate slot adapted on the rotation of said plug element to bear against the adjacent faces of two of said bars to establish electric connection between said horizontal and said vertical system, and insulated pins bridging the gaps between said bars and extending in the path of movement of said segment shaped projections at the height of said slots, said pins adapted during the rotation of said contact element to bear against the outer edge of said slots and pull said circuit closing elements tightly against the milled out portions in said bars.

ARTHUR LINKER.